(12) United States Patent
Angelo et al.

(10) Patent No.: US 7,051,196 B2
(45) Date of Patent: May 23, 2006

(54) LOCATION-BASED SECURITY FOR A PORTABLE COMPUTER

(75) Inventors: Michael F. Angelo, Houston, TX (US); Sompong P. Olarig, Pleasonton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 871 days.

(21) Appl. No.: 10/006,331

(22) Filed: Dec. 5, 2001

(65) Prior Publication Data

US 2003/0105971 A1 Jun. 5, 2003

(51) Int. Cl.
*G06F 15/177* (2006.01)
*G06F 9/00* (2006.01)

(52) U.S. Cl. .............................. 713/1; 713/2; 380/258
(58) Field of Classification Search ................ 713/201; 380/258
See application file for complete search history.

(56) References Cited

U.S. PATENT DOCUMENTS

| | | | |
|---|---|---|---|
| 5,812,961 A * | 9/1998 | Enge et al. ................. 701/207 |
| 5,922,073 A * | 7/1999 | Shimada ..................... 713/200 |
| 6,418,533 B1 * | 7/2002 | Angelo et al. ................ 726/19 |
| 2002/0094777 A1 * | 7/2002 | Cannon et al. ............... 455/41 |

OTHER PUBLICATIONS

*Trusted Computing Platform Alliance*, Main Specification Version 1.1, Compaq Computer Corporation et al., Jul. 31, 2001.

* cited by examiner

*Primary Examiner*—Gilberto Barrón, Jr.
*Assistant Examiner*—Kristin Derwich

(57) ABSTRACT

An electronic system embodies a security system which provides varying levels of security based on the location of the system. As such, the system includes a location module, such as a geosynchronous positioning system ("GPS") receiver that permits the system to determine its location relative to a plurality of preset location areas. Such location areas might be programmed to include the user's office, home, predetermined location for a business trip and the like. Based on the location area in which the system is located, the system invokes a security mode associated with that particular location area. Different location areas may have different security modes.

30 Claims, 1 Drawing Sheet

LOCATION-BASED SECURITY FOR A PORTABLE COMPUTER

CROSS-REFERENCE TO RELATED APPLICATIONS

Not applicable

STATEMENT REGARDING FEDERALLY SPONSORED RESEARCH OR DEVELOPMENT

Not applicable.

BACKGROUND OF THE INVENTION

1. Field of the Invention

The present invention generally relates to computer security. More particularly, the resent invention relates to location-based computer identity which can be seen as a component in security system. Still more particularly, the invention relates to the use of a location device, such as GPS receiver, to select one of a plurality of user access or security modes based on the location of the computer.

2. Background of the Invention

For years computer security has been a concern. Computer systems of individuals and especially corporations typically include confidential and valuable information. Early on, identity, and security, were established by requiring a user to enter a correct password to log on to the system. The use of passwords still remains one of the most widely used security techniques.

The concern for identity and security has increased with the advent of portable computers which can be used to remotely obtain access to a network. For example, a laptop computer can be used from a remote location, such as a house or a hotel room, to log on to a company's network. Often, a password is required before access is permitted. Typically, once the user's password is successfully verified, that user will have full access to the network, just as if the user had logged in from his or her office at the company. In the past systems could define access based on the connection point, but even that differentiation is gone.

Although generally satisfactory, this type of security methodology is not without its problems. For instance, if the laptop computer was stolen and the thief also stole or could guess the password, the thief could remotely gain access to the company's network and thus confidential information. In such an instance, for obvious reasons it would be highly desirable to preclude access to the network or at least reduce access privileges. Even apart from the context of a theft, a company might desire to reduce access to certain information from locations outside the physical confines of the company, even by authorized personnel. Accordingly, an access control or security system is needed which addresses these concerns.

BRIEF SUMMARY OF THE INVENTION

The problems noted above are solved by an electronic system (e.g., portable computer device) embodying an access control (or security) system which provides varying levels of access based on the location of the system. As such, the system includes a location module, such as a geosynchronous positioning system ("GPS") receiver. This would permit the system to determine its location relative to a plurality of preset location areas. Such location areas might be programmed to include the user's office, home, predetermined location for a business trip and the like.

During boot up, or at another time, the system determines in which location area it currently is located and invokes an access mode associated with that particular location area. The various access modes can range from permitting the user full access to a local system or remote network, to permitting very limited access to a local system or remote network or to any access to the local or remote system. Such limited access might be limited to just email access or read only access to certain files contained on a remote network or on the local computer system itself. The various location areas preferably are predefined and can be updated whenever necessary by the user or a network administrator.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
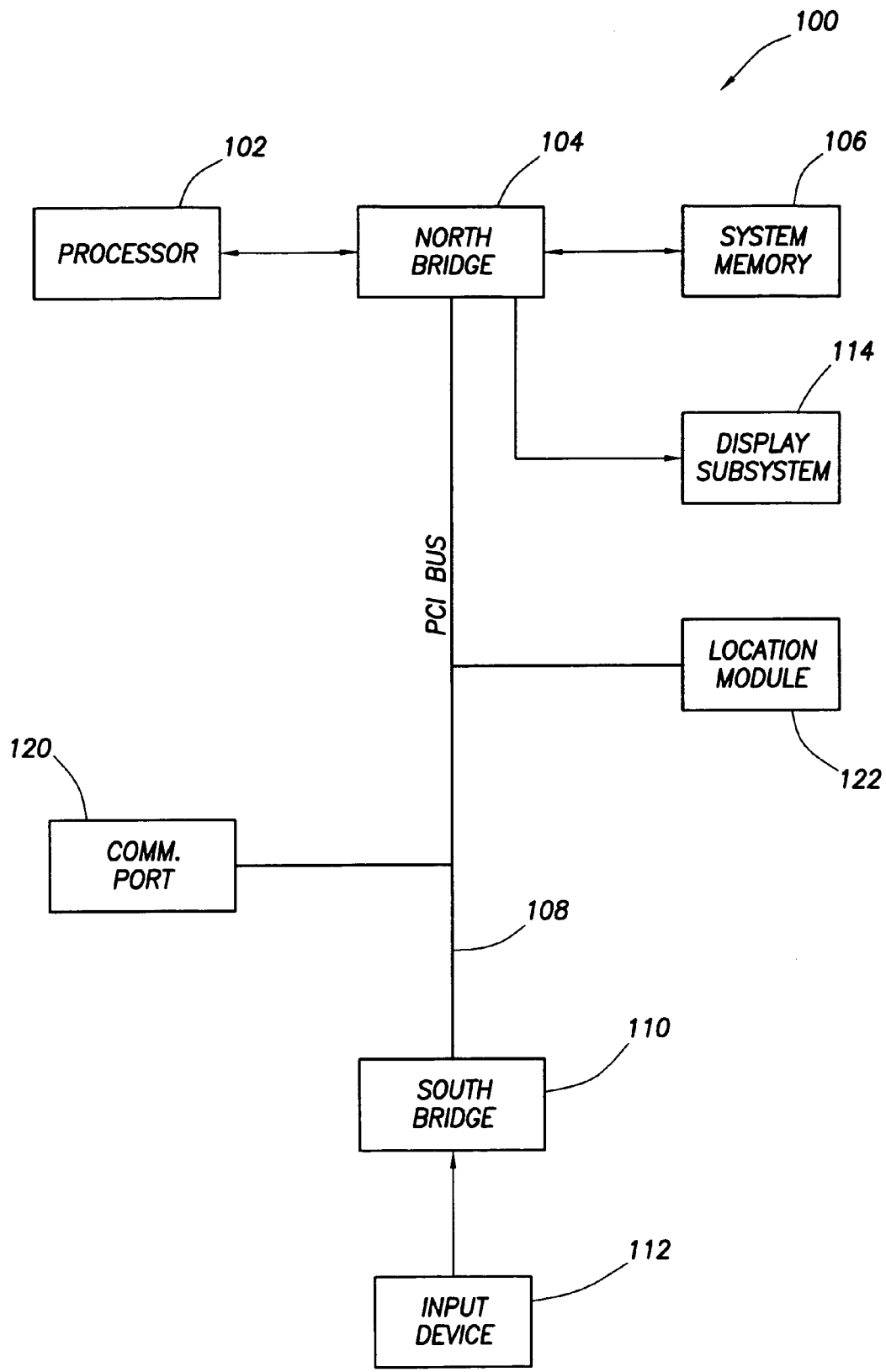
FIG. 1 is a preferred computer system diagram in which a location module is included as a basis for the security system of the computer.

Certain terms are used throughout the following description and claims to refer to particular system components. As one skilled in the art will appreciate, computer companies may refer to a given component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device "couples" to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Referring now to FIG. 1, an electronic system 100 constructed in accordance with the preferred embodiment of the invention is shown. System 100 preferably comprises a computer system and more preferably a portable computer (e.g., a desktop computer or a laptop or handheld device). As shown, computer system 100 includes a host processor 102, a north bridge 104, system memory 106, a south bridge 110, an input device 112 (e.g., a mouse or keyboard), a display subsystem 114, and various peripheral devices 120 and 122 coupled to the north bridge 104 via a bus 108. The north bridge couples to the processor 102, memory 106 and display subsystem 114, and couples to the south bridge 110 via bus 108 which preferably comprises a peripheral component interconnect ("PCI") bus (or equivalent). As shown, the peripheral devices 120 and 122 couple to the PCI bus 108, but alternatively may attach to the system in other ways.

Peripheral device 120 preferably comprises a communication port to provide access to a remote network. Device 120 may comprise, for example, network interface card ("NIC"), modem or other means for permitting the computer 100 to communicate with a remote network.

Peripheral device 122 preferably comprises a location module which provides location information to the computer. The location information may be an absolute location or a location relative to a reference point. The module may include a geosynchronous positioning system ("GPS") receiver, a low earth orbit satellite ("LEOS") receiver, or any other type of device that provide spatial location information to the computer. By way of further example, the location module 122 may comprise a cellular telephone transceiver which, using triangulation, can be used to provide location information. Preferably, the location module 122 is selected and designed to provide whatever accuracy is desired.

In accordance with the preferred embodiment of the invention, the computer 100 implements an access/security scheme or mode (generally referred to as an "operating mode" in the claims) that is based on the location of the computer. The access/security modes specify certain log on and/or access privileges to a local system or remote network and are thus dependent on the location of the computer relative to a plurality of predetermined or programmed location areas. Once it is determined in which location area the computer currently resides, an access/security mode predetermined for that particular area is invoked. By providing a plurality of access/security modes which are individually selected based on where the computer is located, security can be customized to location. For example, access can be decreased or the security can be increased as the computer moves outside a geographic region (e.g., the user's office). The access/security mode can be implemented on the computer 100 itself and/or communicated to the remote network for implementation. If the access/security mode is communicated to the remote network, the remote network could restrict use of the network by the computer in accordance with the computer's access/security mode.

By way of example, two location areas could be implemented. One area might include the normal location of the computer during regular business hours, such as the company's location, while another area might be defined as being outside the company. Thus, if the computer 100 is within the company's confines, one security mode could be applied. However, if the computer is outside the company's confines, a different set of rules could be applied. The various security modes can be invoked, for example, during the boot up process during which the computer's processor could use the location module 122 to determine its location. The processor 102 then compares its location to a plurality of location areas to determine in which area the computer is located. Based on the location area, the computer would then boot up with or otherwise invoke a access/security mode preset for that location area. Also, the selection of the access/security mode could be performed when a user is using the computer 100 to log on to a remote network via the communication port 120. Further, the computer could be programmed to re-evaluate its location at a predetermined interval of time and re-set its security mode if the computer has been transported from one location area to another. Further still, the computer could be programmed to re-evaluate its location before attempting to perform certain transactions, such as accessing certain pre-designated files or applications on the network.

The access/security mode introduced above is intended to be invoked in addition to whatever normal security features have been put in place for the user. The user normally may be granted full access to all data and applications or be granted limited access to the data and applications. The access/security modes invoked based on location are intended to provide an additional layer of security on top of the normal security restrictions imposed for the user by, for example, a network administrator. Thus, the access/security modes either provide no further restrictions or provide additional restrictions. If a user normally is not granted access to a certain file, the security modes described herein would not undo that restriction to grant access to the user.

There is a great deal of flexibility on what each security mode includes. The modes can apply to the local machine and its operation or to access to a remote network. One mode could permit a user to log on to the local or remote network and be granted full access privileges meaning that the user could access all information and applications normally afforded to that user. This mode might be used, for example, if the user's computer was located in his or her office. Another mode could restrict access to data and/or applications. For example, in this latter mode the user might be restricted to email access only. Also, certain or all files can be designated "read only" and not changeable by the user in this mode. Further still, certain files or programs can be made inaccessible by the computer while in this mode. Such inaccessibility can be implemented by simply not showing an icon on the display 114 for the files or applications which are designated as off limits to the user. Alternatively, the icon could be shown on the display thereby permitting the user the ability to try to view or run that file or application, but the security mode will prevent the file from actually being viewed or the application from being run. Instead, an error message could shown on the display 114 alerting the user that the selected file/application is outside the privileges for that user in the current location area.

Additionally, if desired more than two location areas can be implemented. The following is one example of a six location area implementation. It should be understood, however, that the only requirement is that at least two location areas be implemented. An exemplary six location area implementation might include:

1. the user's office his or her company location,
2. the company location outside the user's office, but in the user's building (assuming a multi-building company),
3. the company location outside the user's building,
4. the user's home,
5. a certain location apart from the company location and the user's home (e.g., a location used on a business trip), and
6. any other location not identified in the preceding five location areas.

The access/security modes for each of these six location areas can be defined differently for each area or two or more areas can have the same security mode. For example, the "at work" location area can be assigned a security mode that provides full access privileges. By contrast, the security mode for location number six (i.e., any other location not already defined) could be defined with a set of security rules that only permits very limited access to the network (e.g. email only). Locations 2–5 can be implemented with security modes that limit access as desired.

Each location area preferably is defined in accordance with the location reporting capabilities of the computer's location module 122. For example, if the location module reports a location in terms of a longitude and latitude coordinate, then the boundaries of the location areas are similarly defined in terms of longitude and latitude coordinates. The location area can be defined using a plurality of coordinates to define various vertices or a single coordinate could be used to represent the center of the location area. In this latter approach, the location area could be defined by all locations within a predetermined range of the center coordinate, effectively defining the location area as circle. One of ordinary skill in the art should appreciate numerous ways to define the various location areas and this disclosure and the claims which follow should be interpreted to embrace all such techniques.

It may be possible for an unauthorized person to modify location module of the computer system 100 in such a way to "fool" the computer into determining it is in one location area when, in fact, the computer is actually in another location area. By making the computer think it is in an incorrect location area, a security mode more favorable to the desires of the unauthorized person may be invoked. To prevent this from happening, the computer system 100 and the remote network to which it communicates preferably implement a methodology for the remote network to verify the authenticity of computer 100, in particular the location reporting capabilities of the computer. In suitable methodology can be used in this regard. For example, the Trusted Computing Platform Association, Main Specification, Version 1.1, incorporated herein by reference, can be used. This method specifies that the computer's processor 102 executes code to measure various software and hardware characteristics of the system. One such characteristic could be a predetermined attribute or signal from the location module. This information then could be converted into a digital certificate in accordance with well-known techniques. The certificate would then be transferred through the computer's communication port 120 to the remote network which verifies the certificate in accordance with well-known techniques. If the certificate is successfully verified, the remote network is assured that the computer system 100 is authentic and valid and, accordingly, the network permits access by the computer in accordance with the security mode invoked by the computer.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor;
   a communication port through which the computer system can communicate with a remote network; and
   a location module coupled to said processor;
   wherein said processor receives a signal from the location module to determine at boot-up the location of the computer system relative to a plurality of pre-programmed location areas and, invokes an operating mode for said computer system based on the location area in which the computer system is located.

2. The computer system of claim 1 wherein said location module includes using a geosynchronous positioning system receiver.

3. The computer system of claim 1 wherein said location module includes using a low earth orbit satellite receiver.

4. The computer system of claim 1 wherein said location module includes using a cellular telephone transceiver.

5. The computer system of claim 1 wherein said operating mode includes precluding access to the remote network.

6. The computer system of claim 1 wherein said operating mode includes permitting access to the remote network, but with limited access privileges.

7. The computer system of claim 1 wherein said operating mode includes permitting access to the remote network, but the computer system cannot run at least one application running on said remote network.

8. The computer system of claim 1 wherein said operating mode includes permitting access to the remote network, but the computer system cannot access at least one data set stored on said remote network.

9. The computer system of claim 1 wherein each of said plurality of location areas has an associated operating mode and at least two of said operating modes differs.

10. The computer system of claim 1 wherein said location areas includes a first location area and a second location, and said first location area has a first operating mode and said second location area has a second a operating mode, said first operating permits full access to a remote network and said second operating mode permits only limited access to said remote network.

11. The computer system of claim 1 wherein said location areas includes six location areas each having its own operating mode.

12. The computer system of claim 1 wherein said operating mode includes restrictions on the operation of the computer system itself.

13. A method of providing security for a computer, comprising:
   (a) determining the location of the computer;
   (b) comparing the location determined in (a) against a plurality of location areas;
   (c) determining in which location area the computer is located; and
   (d) at boot-up, invoking an operating mode preset for the location area determined in (c).

14. The method of claim 13 wherein (a) includes using a geosynchronous positioning system receiver.

15. The method of claim 13 wherein (a) includes using a low earth orbit satellite receiver.

16. The method of claim 13 wherein (a) includes using a cellular telephone transceiver.

17. The method of claim 13 wherein said operating mode includes precluding access to a remote network.

18. The method of claim 13 wherein said operating mode includes permitting access to a remote network, but with limited access privileges.

19. The method of claim 13 wherein said operating mode includes permitting access to a remote network, but the computer cannot run at least one application running on said remote network.

20. The method of claim 13 wherein said operating mode includes permitting access to a remote network, but the computer cannot access at least one data set stored on said remote network.

21. The method of claim 13 wherein each of said plurality of location areas has an associated operating mode and at least two of said operating modes differs.

22. The method of claim 13 wherein said location areas includes a first location area and a second location, and said first location area has a first operating mode and said second location area has a second operating mode, said first operating mode permits full access to a remote network and said second operating mode permits only limited access to said remote network.

23. The method of claim 13 wherein said location areas includes six location areas each having its own operating mode.

24. The method of claim 13 wherein said operating mode restricts operation of the computer.

25. The computer system of claim 1, wherein said processor re-evaluates the location of the computer system at predetermined time intervals.

26. The computer system of claim 25 wherein said processor invokes an operating mode for said computer based on said re-evaluated location at said predetermined time intervals.

27. The method of claim 13 further comprising, at predetermined time Intervals, re-evaluating the location of the computer.

28. The method of claim 27 further comprising invoking an operating mode preset for the re-evaluated location.

29. A computer system, comprising:
 a processor;
 a communication port through which the computer can communicate with a remote network; and
 a location module coupled to said processor;
 wherein said processor receives a signal from the location module to determine, at predetermined time intervals, the location of the computer system relative to a plurality of pre-programmed location areas and, to invoke at each such predetermined time interval an operating mode for said computer based on the location area in which the computer is located.

30. The computer system of claim 29 wherein said processor also determines the boot-up location of the computer system during boot-up and, also at boot-up, invokes an operating mode based on the boot-up location.

* * * * *

UNITED STATES PATENT AND TRADEMARK OFFICE
CERTIFICATE OF CORRECTION

PATENT NO. : 7,051,196 B2
APPLICATION NO. : 10/006331
DATED : May 23, 2006
INVENTOR(S) : Michael F. Angelo et al.

It is certified that error appears in the above-identified patent and that said Letters Patent is hereby corrected as shown below:

In column 1, line 18, delete "resent" and insert -- present -- therefor.

In column 1, line 20, insert -- a -- before "security".

In column 7, line 9, in Claim 27, delete "Intervals" and insert -- intervals --, therefor.

Signed and Sealed this

Twenty-fourth Day of March, 2009

JOHN DOLL
*Acting Director of the United States Patent and Trademark Office*